United States Patent [19]

Deakins et al.

[11] Patent Number: 5,241,590
[45] Date of Patent: Aug. 31, 1993

[54] TELEPHONE DIALING APPARATUS

[75] Inventors: Darrell Deakins, Brantford; John Bell, Scarborough, both of Canada

[73] Assignee: Dialing Devices Inc., Brantford, Canada

[21] Appl. No.: 629,471

[22] Filed: Dec. 18, 1990

[51] Int. Cl.$^5$ ............................................. H04M 1/27
[52] U.S. Cl. .................................. 379/356; 379/354; 379/355; 379/441
[58] Field of Search ............... 379/354, 355, 356, 216, 379/444, 438, 441, 442

[56] References Cited

U.S. PATENT DOCUMENTS

| | | | |
|---|---|---|---|
| 4,673,228 | 6/1987 | Ditzig | 439/21 |
| 4,699,591 | 10/1987 | Gallo et al. | 439/21 |
| 4,699,592 | 10/1987 | Gallo et al. | 439/27 |
| 4,805,211 | 2/1989 | Brennan et al. | 379/355 |
| 4,817,135 | 3/1989 | Winebaum | 379/355 |
| 4,870,679 | 9/1989 | Hanna et al. | 379/355 |
| 4,882,750 | 11/1989 | Henderson | 379/355 |
| 4,995,077 | 2/1991 | Malinowski | 379/444 |

OTHER PUBLICATIONS

Datasheet Published by Gould AMI Semiconductors 'DTMF Tone Generator with Redial, S2569/S2569A.'

Primary Examiner—James L. Dwyer
Assistant Examiner—Magdy W. Shehata

[57] ABSTRACT

A device for dialing a preprogrammed telephone number is inserted between a cord connecting the handset and body of a telephone set and either the handset or the body. In order to provide an incentive for installing the device, it is preferably incorporated in a cord detangler having a jack for receiving one end of the cord and a relatively rotatable plug for insertion in a jack in the handset or body. A push button switch on the device activates the redial function of a DTMF tone generator chip which is connected electrically in parallel with the microphone conductor pair of the cord connection. A nonvolatile redial memory is provided, either by providing battery backup for the chip so as to retain a preprogrammed number in memory even when polarization current is not available to power the chip, or by providing a read-only redial memory. The tone generator chip may include an electronic switch array through which it can detect the identity of the conductors in the cord to the handset and then establish suitable connections to the chip.

13 Claims, 3 Drawing Sheets

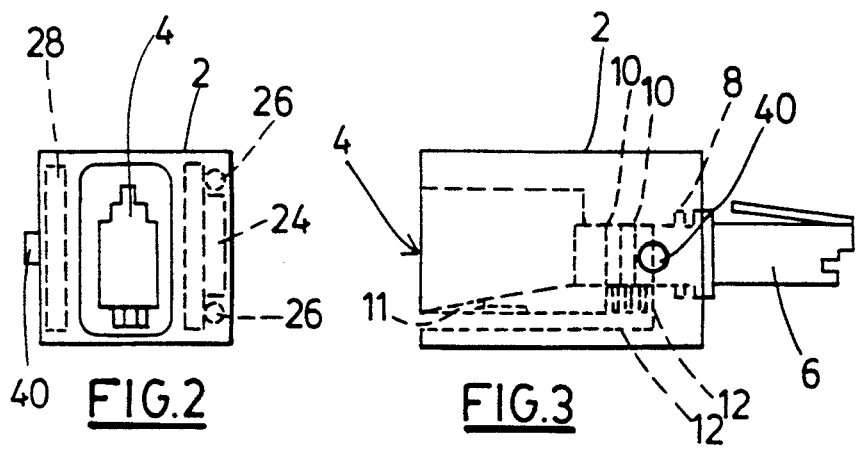
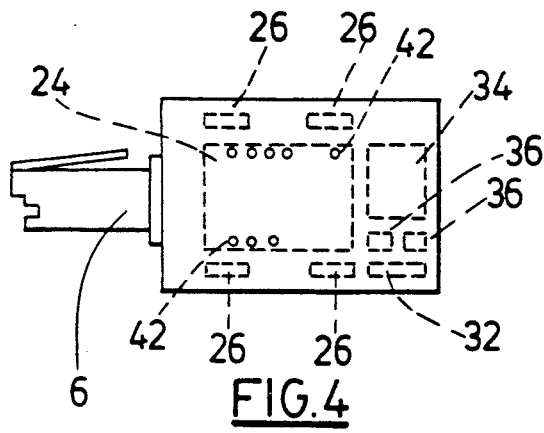
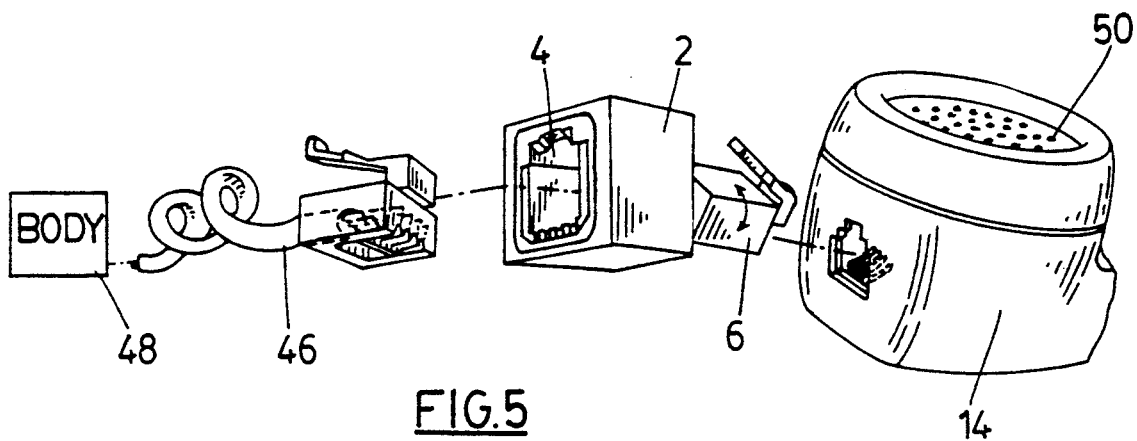

TELEPHONE DIALING APPARATUS

The present invention relates to devices for automatically placing telephone calls to a predetermined number. Such a device may be distributed for example as part of a marketing scheme addressed to potential customers for goods or services which can be ordered by telephone, or sold as an emergency dialing device for reaching an emergency service number.

Devices of this nature are already known. U.S. Pat. No. 4,817,135 issued Mar. 28, 1989 to Winebaum, discloses an automatic telephone dialing device for mass distribution to the public. This device may be distributed with mass-distributed media such as books or magazines. It consists of a speaker, an activation switch, a DTMF tone generator chip and a battery power supply. When activated, this device will generate a sequence of DTMF tones required to access a single telephone number and is held adjacent a telephone handset so that it is acoustically coupled to a microphone in the handset to transmit the tones to an exchange. It is intended to be associated with a marketing system wherein such devices allow members of the public automatic access to centralized information systems or other sources of products or services. Such a device can be manufactured relatively inexpensively and provides a convenient means for a person to reach a specific telephone number without having to memorize it or look it up.

U.S. Pat. No. 4,882,750 issued Nov. 21, 1989 to Henderson et al discloses a similar device, with means to reprogram the stored number.

U.S. Pat. No. 4,805,211 issued Feb. 14, 1989 to Brennan et al discloses a module that can be plugged into specially constructed telephone sets to program the latter with preselected telephone numbers. This device is of course only useful in conjunction with a specific type of telephone set.

A portable device such as that disclosed in U.S. Pat. No. 4,817,135 relies on proper acoustic coupling to a telephone handset for reliable operation, and it may be difficult to ensure that it is handled by a user in a manner which will ensure adequate acoustic coupling and thus reliable dialing. Furthermore, it is difficult to ensure that any such small portable item will be to hand on the occasions when it is actually wanted. Desirably such a device should be continuously electrically coupled to and integral with the telephone itself, but this has not hitherto been feasible for a low cost device which is widely distributed, particularly as part of a marketing scheme, because such a device needs both to be applicable to a wide range of telephone equipment, and to be installable by an unskilled end user; moreover, in cases where the device is distributed for promotional purposes, the end user may need some motivation to install such a device beyond that of some minor convenience in placing orders with the business which has supplied the user with the device.

SUMMARY OF THE INVENTION

The applicant has devised a means by which such a stored number tone dialing device may not only be continuously electrically coupled by an unskilled user to any of a wide range of telephone sets, in a manner which does not interfere with normal use of the set, but also the user of the telephone may be provided with substantial independent incentive to install the device.

Most telephone sets consist of a main body and a separate handset containing a microphone and a speaker, the body and handset being connected by a flexible cord. In sets of fairly recent manufacture, the flexible cord is connected to jacks in the body and the handset by means of modular plugs. A well known problem with such cords is that they become twisted and tangled due to the handset being rotated during use. In order to solve this problem, accessories known as "detanglers" have been developed in the form of compact units having a modular plug in one part and a modular jack in another relatively rotatable part, electrical connections between the plug and jack being maintained by a slip ring arrangement. Examples of such units are described in U.S. Pat. Nos. 4,699,591 and 4,699,592 (Gallo et al) issued Oct. 13, 1987, and U.S. Pat. No. 4,673,228 (Ditzig) issued Jun. 16, 1987.

I have found that by exploiting certain features of standard telephone technology, it is possible to incorporate a stored number tone dialing device into such a unit connected in series with the flexible cord to the handset. It is thus possible to provide not only means for an unskilled user to electrically connect the device to a wide range of telephone sets, but also by including a detangler function to provide an incentive for the user to keep the device continuously in place since the detangler will be effective at all times. In cases where incentive is less necessary such as in an emergency number dialer, the dialer may be incorporated into a unit providing simply a plug and jack so that it may be inserted in series with the cord, but without the detangler function.

Further features of the invention are set forth in the following description of preferred embodiments thereof and in the appended claims.

SHORT DESCRIPTION OF THE DRAWINGS

FIG. 2 is a view of the device from one end;

FIG. 3 is a view of the device from one side;

FIG. 4 is a view of the device from the other side;

FIG. 5 is a view illustrating how the device is utilized; and

DESCRIPTION OF THE PREFERRED EMBODIMENT

Figure 1:
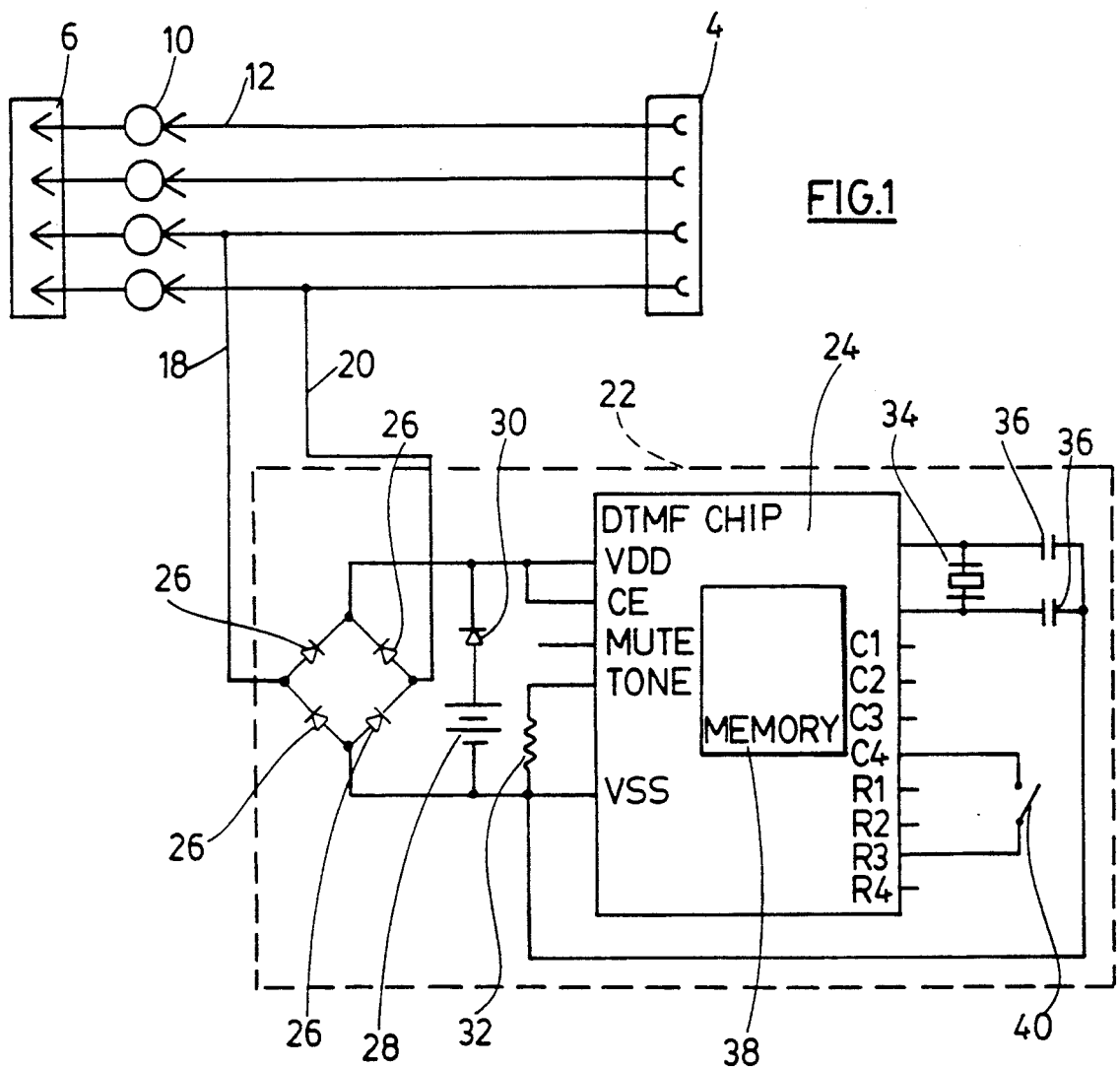
FIG. 1 is a schematic diagram of a first embodiment of a device according to the invention.

Both embodiments to be described are based upon a telephone handset cord detangler as disclosed and described in detail in U.S. Pat. No. 4,673,228. Since such detanglers are known in the art and widely available on the retail market, detailed description is believed unnecessary, beyond stating that it comprises a body 2 containing a jack 4 for reception of a modular plug, a modular plug 6 extending from a spigot 8 mounted for rotation within the body, and a slip ring assembly comprising slip rings 10 on the spigot, and brushes 12 formed by extensions of conductors 11 in the jack 4. The arrangement provides continuity for two conductor pairs contained in the cord and completing circuits respectively through the microphone 50 and the speaker in a handset 14. Two of the jack connectors, specifically those providing the conductor pair to the microphone in the handset 14 are tapped by lines 18, 20 leading to a circuit 22 accommodated within the body 2.

In a first embodiment shown in FIG. 1, this circuit comprises a standard DTMF (Dual Tone Multiple Frequency) tone generator chip 24 incorporating a redial function. Such chips are widely used in telephones and other devices for connection to standard telephone circuits having tone dialing capabilities. A suitable chip is that sold by Gould AMI Semiconductors under the designation S2569 and more fully described in the manufacturers data sheet relating to that chip. (Alternatively a pair of monophonic chips related simultaneously could be used). The supply pins VDD and VSS of the chip are connected to the lines 18 and 20 through diodes 26 forming a bridge rectifier so as to ensure that current reaching the chip is of the correct polarity; in the present embodiment the chip relies primarily for its supply upon the unidirectional polarization current supplied by the main unit of the telephone to the microphone in the handset when the telephone is in an off-hook condition. A backup supply is provided to the chip, prior to installation and when the telephone is in on-hook condition, by a small 3-volt battery 28 in series with a diode 30 which can provide for a long period the minimum 2.5-volt supply and negligible current required by the chip in a standby condition. When sufficient polarization potential is available across the microphone circuit, the diode 30 is reverse biased, thus isolating the battery.

A chip enable pin CE of the chip is connected to pin VDD to maintain the chip permanently enabled, and a mute pin MUTE is not used. A tone output pin TONE is connected to pin VSS through a load resistor 32 to load the output of the chip and ensure its normal operation, but is not otherwise externally connected. A crystal 34 and capacitors 36 and 38 are connected in a network between pins OSC1, OSC2 and VSS in accordance with the manufacturers recommendations to complete a clock circuit from which the chip derives its tone outputs.

The chip is also provided with row and column pins C1, C2, C3, C4, R1, R2, R3 and R4 which in normal use of the chip are connected to rows and columns of a matrix normally open key switches as disclosed in the manufacturers specifications. Such a matrix of key switches (not shown) is temporarily connected to these pins in order to program the device prior to sale by entering the digits of a number which the device is intended to dial when in use. This results in this number being stored in a redial memory 38 of the device. This number can subsequently be redialled when required (until such a time as the device is reprogrammed with another number, or is powered down) by connecting pins C4 and R3 through a push-button, normally open single pole switch 40. In order to facilitate programming of the device during manufacture, or subsequent reprogramming, the housing 22 may be formed with small holes 42 above the row and column pins of the chip 24 through which a matrix of probe pins connected to a suitable keypad may be inserted. Instead of a keypad, a preprogrammed device providing an automated sequence of connections between row and column pairs of pins may be utilized to speed manufacture.

In use, the device is connected between the handset 14 and a handset cord 46 as shown in FIG. 5, or alternatively between the handset cord and the telephone body 48, as may be convenient. It then immediately functions as a cord detangler, providing an incentive to fit the device to the telephone. Anyone who desires to call the preprogrammed number merely lifts the handset to place the telephone in an off-hook condition, and presses the pushbutton switch 40 to initiate the redial function of the chip 24, which is now receiving power from the microphone circuit by virtue of being connected, through the bridge rectifier, in parallel with the microphone 50 in the handset, so that it receives some of the polarization current intended for the microphone. In a normal, standby condition, the chip 24 draws negligible current, but when generating DTMF tones during redial, it draws substantial pulses of current, whose magnitude can be adjusted by choice of the value of resistor 32, and thus represents a variable impedance in parallel with the microphone. This varies the polarization current drawn by the microphone circuit just as if the tones had been sensed directly by the microphone, which is typically of carbon granule or equivalent type in which incident sound is converted into impedance variations. The sequence of tones generated by the chip is thus introduced into the microphone circuit, even though the tone output pin TONE is not provided with any signal output.

Where large numbers of devices are to be produced for dialing the same number, it may be preferred to provide a custom chip in which the redial memory, instead of being read/write memory as in the standard chip, is read-only memory preprogrammed with the desired number. In this case access to row and column connections to the chip may be omitted, except as required by the switch 40, and various other facilities may be included to assist in making the unit compatible with the widest possible range of available telephone instruments.

Figure 6:
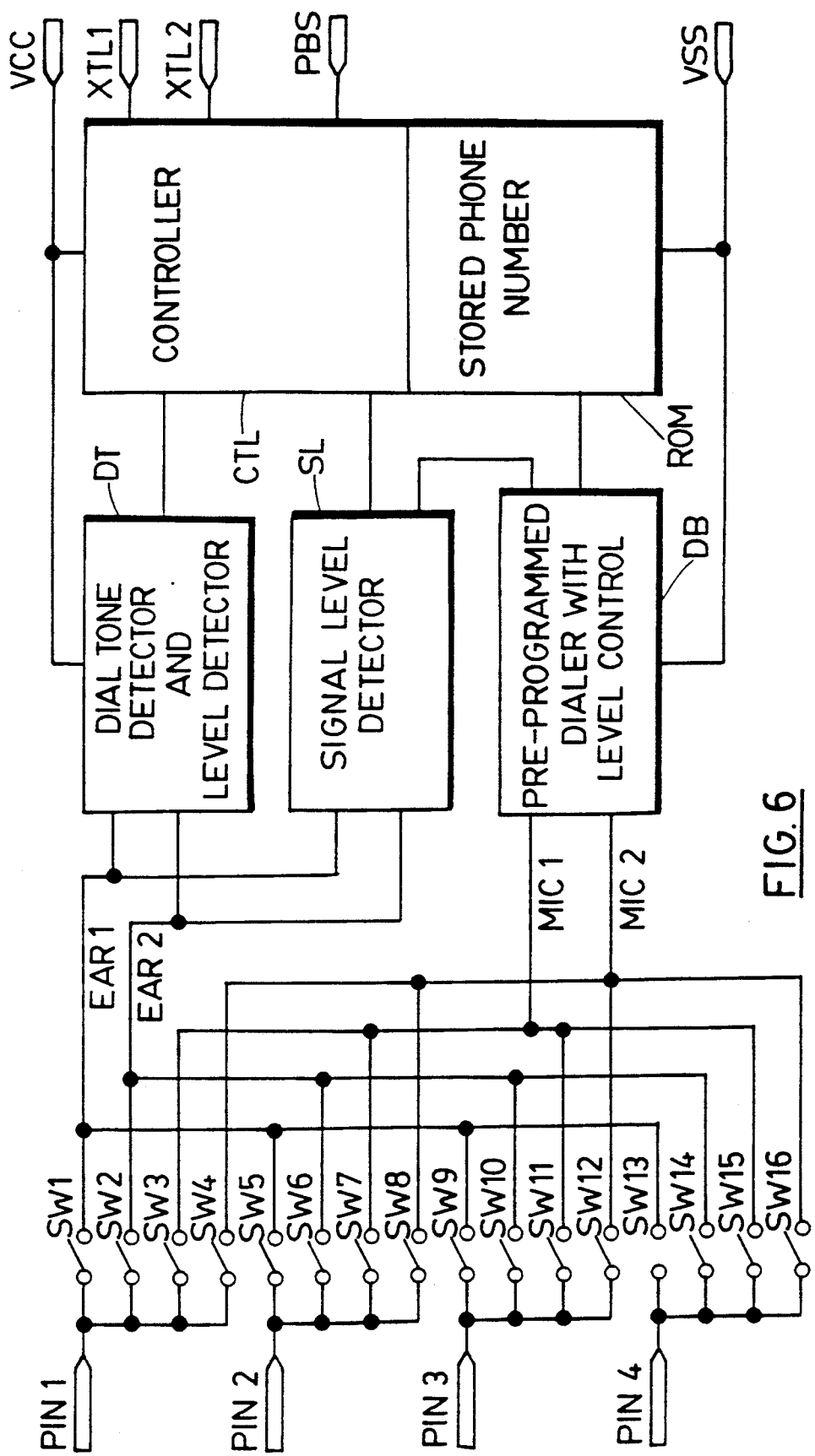
FIG. 6 is a block schematic diagram of a second embodiment of the invention.

We have found that there is a lack of consistency both in the means of energization and electrical sensitivity of microphones utilized in commonly available telephone sets, as well as in the functional allocation of the conductors connecting the handset to the body. By utilizing a custom tone generator chip, typically an ASIC (APPLICATION SPECIFIC INTEGRATED CIRCUIT), these problems also can be addressed. Referring to FIG. 6, which shown an internal block diagram of a presently preferred integrated circuit of this type, four external connections PIN1, PIN2, PIN3, PIN4 are provided connected respectively to each of the conductors 12 through the detangler 2, two connections VCC and VSS to the battery 28, two connections XTL1 and XTL2 to the crystal 34, and a connection PBS to the switch 40, the other terminal of which is connected to connection VSS. The connections PIN1 through PIN4 to the conductors 12 may be made through capacitors so as to block DC potentials whilst providing a low impedance path for voice band signals.

The integrated circuit comprises an array of electronically controlled switches or transmission gates SW1 through SW16, connected so that by suitable selection of four switches to turn on, connections PIN1 through PIN4 can be selectively connected to lines MIC1, MIC2, EAR1 and EAR2 respectively. A dial tone detector and dial tone level detector DT receives inputs from conductors EAR1 and EAR2, as does a signal level detector SL. A DTMF dialler block DB has outputs connected to conductors MIC1 and MIC2, its output level being controlled by an input received from signal level detector SL. The dialler block receives data as to a phone number to be dialed from mask programmed read only memory (ROM) or electrically programmable read only memory/EPROM which is controlled by a controller CTL which also controls the other parts of the circuit already mentioned above. In use of this embodiment of the device, it is installed as described in relation to the previous embodiment. In an initial state, with the switch 40 open, and the battery 28 connected, the controller maintains the circuit in a standby, low power consumption mode, with the switches SW1–SW16 open and the dialler DB inactive. The connection PBS is pulled up internally to a high state.

When the switch 40 is momentarily closed, it pulls the connection PBS down to a low state, and initiates a sequence of operations under control of the controller CTL. A master oscillator circuit in the controller connected to the crystal 34 commences to run, and different combinations of two of the switches SW1 to SW16 are closed in turn such as to connect different pairs of the terminals PIN1 through PIN4 to the lines EAR1 and EAR2 respectively. As each pair is selected, the dial tone detector tests for the presence and amplitude of a dial tone signal between lines EAR1 and EAR2 and determines its level. The levels obtained for each pair of terminals are compared, and the pair producing the highest level signal is assumed to be the part of terminals connected to the earphone or speaker lines of the telephone handset. The remaining pair of connections is then assumed to be the pair connected to the microphone of the handset, and a further pair of the switches SW1 to SW16 is closed by the controller to establish connections between this remaining pair and the lines MIC1 and MIC2 respectively.

At this point, the controller activates the DTMF dialler block DB to generate DTMF dialling tones in accordance with data passed under control of the controller to block DB from memory ROM, and at frequencies derived from the master oscillator in the controller CTL, the tone signals generated being applied to lines MIC1 and MIC2. The signal level detector SL receives these tone signals as they are returned by the telephone set to the telephone earpiece and thence pass to lines EAR1 and EAR2. It determines their level, and generates a gain control signal which is applied to dialler block DB to control the amplitude of the signal applied to lines MIC1 and MIC2. This permits automatic compensation for differing sensitivities and impedances presented by different sets to electrical signals applied to their microphone connections. On completion of the dialing sequence, the circuit returns to its original quiescent state in which its current consumption is essentially negligible.

Whilst the detangling function is an important incentive to users to install the device, such incentive may be less necessary when the device is used for example to call an emergency number, and is purchased by a user for that purpose. In such a case, or where some alternative incentive to install the device can be found, those features associated with the detangling function (the relative rotatability of the spigot, the slip rings 10 and the brushes 12) could be omitted. It would also be possible to render the device of the first embodiment user-reprogrammable by supplying a keypad with probes for insertion through the holes 42.

I claim:

1. A tone-dialing device for direct coupling between a telephone handset and a telephone base including a microphone, and a flexible cord conveying signals between the handset and the base, the device including a body having a first plug engageable with a first socket in said handset, a second socket for receiving a second plug and said flexible cord, multiple conductors including a microphone conductor pair connecting said first plug and said first socket, a DTMF tone generator circuit within the body and generating when operative a signal superimposed upon the microphone circuit of the handset via the microphone conductor pair, the generator having a redial function and including a redial memory preprogrammed with a telephone number, and a manual switch means on said body and connected to said generator for initiating said redial function.

2. A tone-dialing device according to claim 1, wherein the body is a cord detangler comprising said first plug and said second socket whereas said first plug and said second socket are relatively rotatable and the multiple conductors each including slip rings and brushes engaging the slip rings, the slip rings being connected to and rotatable with either one of said first plug or said second socket and brushes being connected to and rotatable with the other of said first plug or said second socket.

3. A tone-dialing device according to claim 1, wherein the tone generator comprises a DTMF tone generator integrated circuit chip having terminals connected electrically in parallel with said microphone conductor pair such that fluctuations in current at said terminals during tone generation cause fluctuations in current in the microphone conductor pair.

4. A tone-dialing device according to claim 3, wherein the body is a cord detangler comprising said first plug and said second socket whereas said first plug and said second socket are relatively rotatable and the multiple conductors each including slip rings and brushes engaging the slip rings, the slip rings being connected to and rotatable with either one of said first plug or said second socket and brushes being connected to and rotatable with the other of said first plug or said second socket.

5. A tone-dialing device according to claim 3, wherein the tone generator chip has a read-write redial memory, and further including a battery power supply connected to power supply terminals of the chip to render the redial memory non-volatile.

6. A tone-dialing device according to claim 2, wherein the tone generator comprises a DTMF tone generator integrated circuit chip having power supply terminals connected electrically in parallel with the microphone conductor pair such that fluctuations in current drawn by the chip during tone generation cause fluctuations in polarization current in the microphone conductor pair.

7. A tone-dialing device according to claim 6, wherein the integrated circuit chip is connected in parallel with the microphone conductor pair through a bridge rectifier.

8. A tone-dialing device according to claim 7, wherein the tone generator chip has a read/write redial memory, and further including a back-up power supply connected to the power supply terminals of the chip to render the redial memory non-volatile in the absence of polarization current in the microphone conductor pair.

9. A tone-dialing device according to claim 1, wherein said DTMF tone generator circuit includes an array of selectably operable switches between the microphone conductor pair and the tone generator circuit, and means to operate said switches selectively to establish a connection between a selected pair of conductors of said multiple conductors and output terminals of said tone generator such that said established connection places said output terminals in parallel with a pair of said conductors carrying signals generated by the microphone.

10. A tone-dialing device according to claim 9, wherein the body is a cord detangler comprising said first plug and said second socket whereas said first plug and said second socket are relatively rotatable and the multiple conductors each including slip rings and brushes engaging the slip rings, the slip rings being connected to and rotatable with either one of said first plug or said second socket and brushes being connected to and rotatable with the other of said first plug or said second socket.

11. A tone-dialing device according to claim 1, wherein said multiple conductors further consists of a speaker conductor pair, and said DTMF tone generator circuit includes and array of selectively operable electronic switches between the microphone conductor pair and the speaker conductor pair, and the tone generator circuit whereas the tone dialing device further includes, means to determine the amplitude of a dialing tone, and a controller responsive to manual switch means to operate said electronic switches selectively to establish a connection between conductors of said conductor pairs and said determining means, and to respond to said established connection to provide a maximum amplitude of the dialing tone by deeming the conductor pair to be the speaker conductor pair and further operation of said electronic switches to establish connections between the other conductor pair, deemed to be the microphone conductor pair, and outputs of said tone generator.

12. A tone-dialing device according to claim 11, further including means to determine the level of a dialing tone signal transferred to the deemed speaker conductor pair by the telephone set from the deemed microphone conductor pair, and means responsive to the level of said dialing tone signal to determine the level of the output from the tone generator.

13. A tone-dialing device according to claim 12, wherein the body is a cord detangler comprising said first plug and said second socket whereas said first plug and said second socket are relatively rotatable and the multiple conductors each including slip rings and brushes engaging the slip rings, the slip rings being connected to and rotatable with either one of said first plug or said second socket and brushes being connected to and rotatable with the other of said first plug or said second socket.

* * * * *